US006683520B1

(12) United States Patent
Sakai

(10) Patent No.: US 6,683,520 B1
(45) Date of Patent: Jan. 27, 2004

(54) MAGNET HAVING DRY PRESSED FLOWER SEALED THEREIN

(75) Inventor: Mieko Sakai, Tokyo (JP)

(73) Assignee: Doppel Co. Ltd., Tokyo (JP)

( * ) Notice: Subject to any disclaimer, the term of this patent is extended or adjusted under 35 U.S.C. 154(b) by 0 days.

(21) Appl. No.: 09/508,859

(22) PCT Filed: Sep. 17, 1998

(86) PCT No.: PCT/JP98/04190

§ 371 (c)(1),
(2), (4) Date: Jul. 21, 2000

(87) PCT Pub. No.: WO99/14063

PCT Pub. Date: Mar. 25, 1999

(30) Foreign Application Priority Data

Sep. 17, 1997 (JP) ........................................ 9/252550

(51) Int. Cl.[7] ........................ H01F 7/20; A01N 3/00

(52) U.S. Cl. ........................ 335/285; 428/13; 428/22; 428/24; 40/600; 40/711

(58) Field of Search ........................ 335/285; 428/13, 428/17, 22, 24; 40/124.04, 600, 711

(56) References Cited

U.S. PATENT DOCUMENTS 4,287,676 A * 9/1981 Weinhaus ................ 248/206.5
4,605,292 A * 8/1986 McIntosh ................ 248/205.3
5,478,613 A * 12/1995 Sugino ........................ 428/13

* cited by examiner

*Primary Examiner*—Ramon M. Barrera
(74) *Attorney, Agent, or Firm*—Schnader Harrison Segal & Lewis LLP

(57) ABSTRACT

A magnetically attachable sealed pressed flower in which a sheet 3 having a pressed dry flower 2 is sealed and fixed by melting and fixing therein is disposed integrally on one surface of a sheet-shaped magnet substrate 1, which can improve the degree of freedom for the selection and alteration of the position or replacement of the kinds of pressed flowers and also enables re-utilization.

18 Claims, 5 Drawing Sheets

MAGNET HAVING DRY PRESSED FLOWER SEALED THEREIN

BACKGROUND OF THE INVENTION

1. Field of the Invention

The present invention concerns a magnetically attachable sealed flower article. More in particular, the invention relates to a magnetically attachable sealed pressed flower article in which a pressed dry flower of a natural color and shape is easily attached as a decorative article for interiors such as used in houses or office rooms, or in automobiles on the surfaces of metal plates or metal products, and detachment and replacement thereof is also easy.

2. Related Art

Sheet-shaped magnets formed by fixing and integrating a magnetic powder by means of a resin binder on a resin sheet such as made of vinyl chloride resin and then magnetizing them have been known. They have been put to practical use in that letters, symbols or characters such as of animals, persons, landscapes and flowering plants are disposed as a color print layer on one surface of the resin sheet of the sheet-shaped magnet and utilized as accessories or interior articles, or as stationeries or teaching supplies.

However, such existent magnet sheet articles have a limit in view of the design or tone of the print layer on the resin sheet when they are utilized as articles for interiors or furnitures having feeling of high quality and are not satisfactory as decorative functional articles.

On the other hand, various sheets, seals or cards formed by laminating pressed dry flowers with a resin have been proposed so far. Further, articles having such lamination products appended on telegraph blanks, plastic plates or wooden plates, as well as glass or metal plates have also been known.

However, such decorative pressed flower articles have not been considered as products having general applicability. For instance, there has not been considered to optionally change the position of attachment on the surfaces of walls or furnitures or replacing them with another pressed flower articles, as well as to cut out the pressed flower along the periphery thereof for reuse including technical means therefor.

SUMMARY OF THE INVENTION

It is, accordingly, an object of the present invention to overcome the problems in the existent magnet sheet articles and decorative pressed dry flower articles, respectively, and provide a novel magnetically attachable sealed pressed flower article which has not even been suggested from the foregoing existent articles, and which can take advantage of the sealed pressed flower articles, has general applicability described above and can be re-used by cutting out as an interior decorative article.

The foregoing object of the present invention can be attained in accordance with a magnetically attachable sealed pressed flower article in which a sheet having a pressed dry flower sealed and fixed therein is disposed integrally on one surface of a sheet-shaped magnet substrate.

In a preferred embodiment, the sheet has a pressed dry flower sealed by a resin film in a bag-shaped configuration.

In another embodiment, the sheet has a pressed dry flower sealed by a lamination of a resin film in a bag-shaped configuration.

In a further embodiment, the sheet has a pressed dry flower sealed with a melting and securing of a hot melt material in a bag-shaped configuration.

In a further embodiment, the sheet-shaped magnet substrate is prepared by disposing a magnetic powder as a magnetic layer using a resin binder to a resin sheet and then magnetizing the magnetic layer.

In a further embodiment, the sheet-shaped magnet substrate is prepared by appending the sheet-shaped permanent magnet to a resin sheet.

Then, in a further embodiment of the present invention, the sheet is integrated by melting and securing by a hot melt material to the substrate.

In a further embodiment, the sheet is appended and integrated by a pressure sensitive adhesive material to the substrate.

In a further embodiment, the sheet has a cover film layer integrally to the outermost layer.

In a further embodiment, the not melt material is a hot melt film or a hot melt powder.

In a further embodiment, a hot melt film, a pressed dry flower, a hot melt film and, optionally, a cover film are placed successively on the sheet-shaped magnet. substrate and they are pressurized under heating in a reduced pressure atmosphere.

In a further embodiment, an intermediate layer having the pressed dry flower article being sealed therein by a molten resin and a transparent film surface layer thereabove are laminated and integrated on one side of the sheet-shaped magnet substrate and wherein the intermediate layer is formed by pressurizing a melting porous resin film under heating in vacuum and adhering the molten resin to the pressed flower article thereby sealing the same, and secured to the substrate and the transparent film surface layer by the molten resin.

In a further embodiment, the melting porous resin film has a three dimensional open cell structure.

In a further embodiment, the melting porous resin film has an average pore size of 1.0 mm or less.

In a further embodiment, the melting porous resin film is melted at a temperature of 110° C. or lower.

In a further embodiment, the thickness of the intermediate layer in which the pressed flower article is adhered and sealed by melting of the melting porous resin film is 4000 $\mu$m or less.

In a further embodiment, the vacuum dried pressed flower article is sealed in the intermediate layer such that bubbles are not substantially present at the periphery of the flower article.

In a further embodiment, the thickness of the transparent film surface layer is 300 $\mu$m or less.

In a further embodiment, the transparent film surface layer is a multi-layered lamination film.

In a further embodiment, the transparent film surface layer has a hard coat layer as the outermost surface layer.

In a further embodiment, the hot melt material is walled between the sheet-shaped magnet substrate and the intermediate layer.

EXAMPLES

The invention of the present application having a unique feature as described above is to be described more in details with reference to the drawings.

Figure 1:
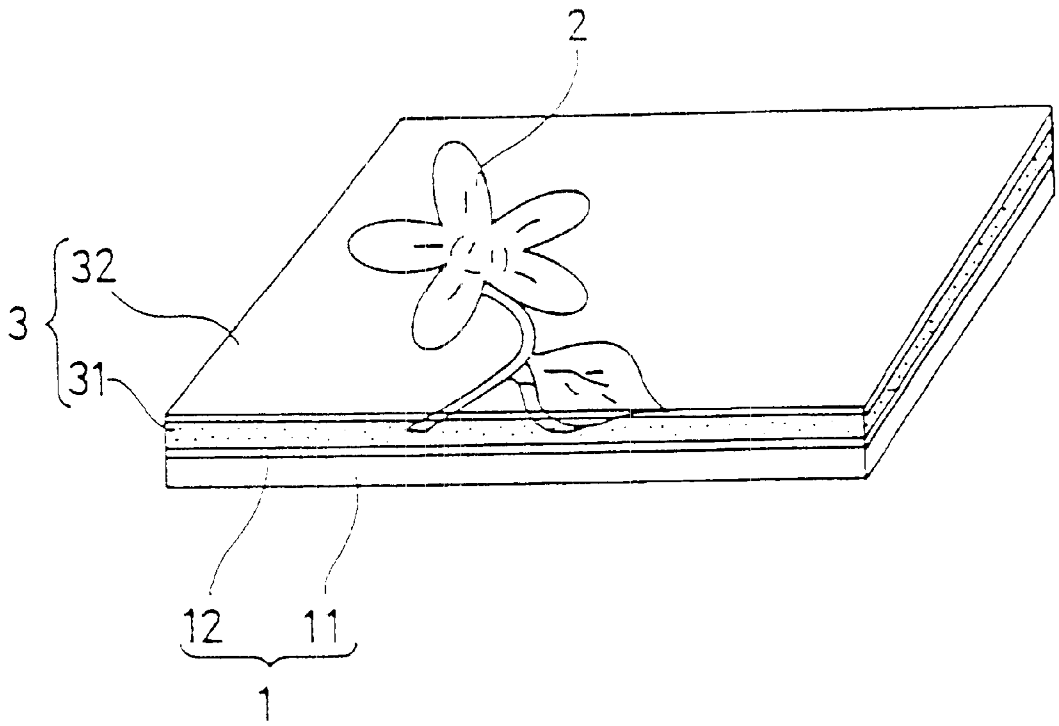
FIG. 1 is a cross sectional perspective view showing a preferred embodiment of the invention.
Figure 2:
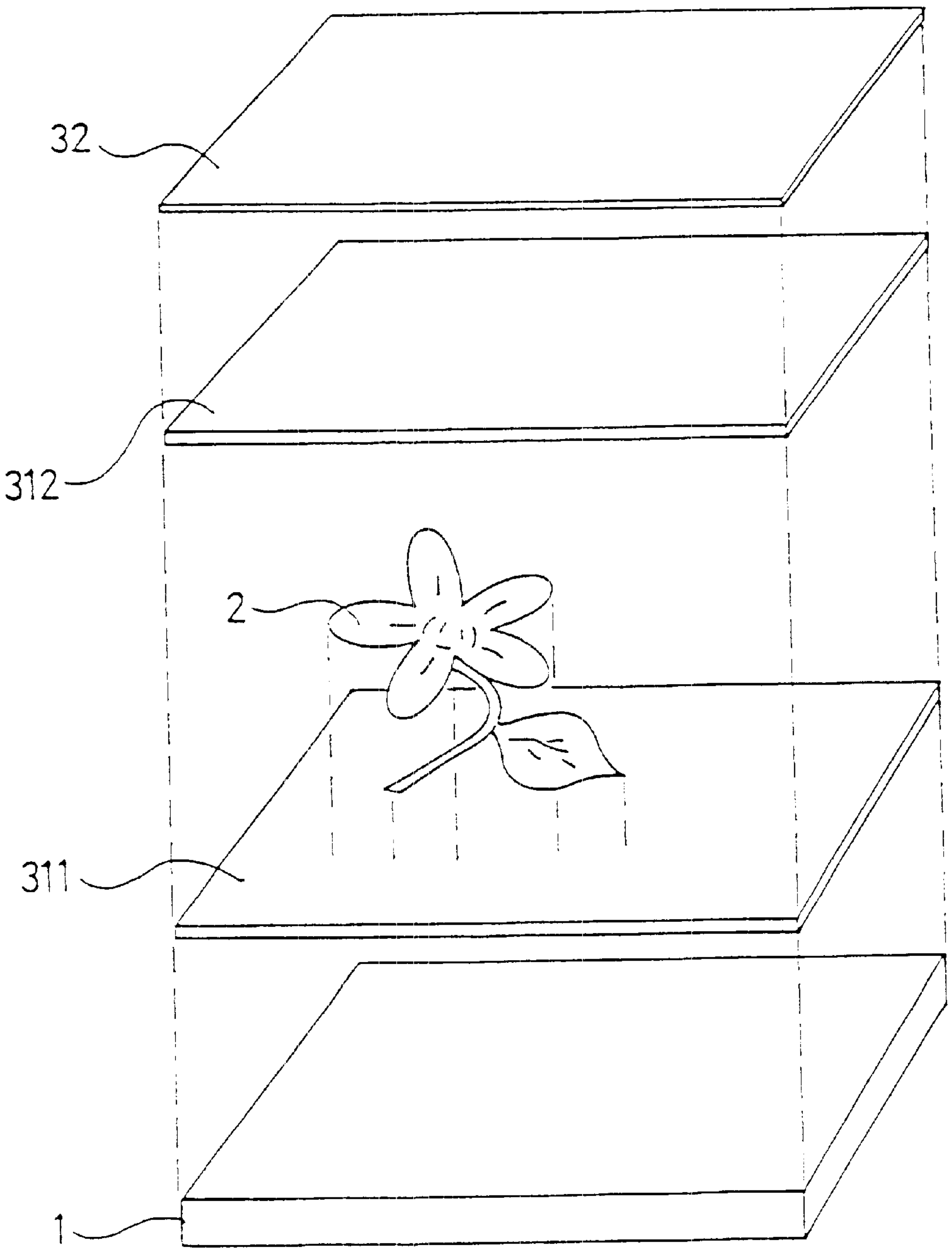
FIG. 2 is an exploded perspective view for the embodiment shown in FIG. 1.

FIG. 1 and FIG. 2 of the appended drawings show one embodiment of the invention. FIG. 1 is a cross sectional perspective view of as a completed article and FIG. 2 is an exploded perspective view thereof.

At first, as illustrated in FIG. 1, a magnet sheet 11 is disposed to a resin sheet 12 to constitute a sheet-shaped magnet substrate 1, and a sheet 3 in which a pressed dry flower 2 is sealed and fixed by a molten fixing layer 31 of a hot melt material is integrally disposed on one side of the sheet-shaped magnetic substrate. In this embodiment, the sheet 3 also has a cover film layer 32 as an uppermost layer.

FIG. 2 shows the constitution more in details in which a hot melt film 311, a pressed dry flower 2, a hot melt film 312 and the cover film 32 are disposed on the sheet-shaped magnet substrate 1, which are hot pressed in a reduced pressure atmosphere to melt the hot melt films 311, 312 thereby melt-sealing the pressed dry flower 2 to form the melt-sealing layer 31 of the pressed dry flower as described-above and they are integrally bonded with the sheet-shaped magnet substrate 1 and the cover film 32.

In the embodiment described above instead of using the hot melt fixing layer 31 by using the hot melt films 311, 312 as the hot melt material, the pressed dry flower 2 may be sealed by lamination using a laminated resin film having an adhesive layer.

However, in the laminate article, since the pressed flower is actually sealed only by the melt-sealing portion at the periphery thereof, it is not always possible to cut out the pressed flower near the periphery thereof inward to the sealed portion for reuse. This is because the sealed state is lost and the pressed flower tends to be put to direct contact with external air and degradation proceeds rapidly. However, since the magnetically attachable sealed pressed flower article using the lamination described above can play a role, depending on the purpose and application use and, accordingly, it is useful to some extent.

On the other hand, use of the hot melt material can provide a novel sealed pressed dry flower article excellent in air and moisture barrier property and capable of keeping fine color and shape for a long period of time. In this case, the pressed dry flower is sealed and encapsulated by molten resin under a controlled reduced pressure atmosphere, which has attracted attention as an article of high quality.

In the embodiment shown in FIG. 1 and FIG. 2, the sheet-shaped magnet 11 may be a permanent magnet as a sheet-shaped molding product or sintering product. Alternatively, for providing the sheet-shaped magnet substrate 1 with a more softness and flexibility, various kinds of magnetic powders may be laminated as a magnetic layer by using a resin binder to the resin sheet 12 and then magnetized to form a magnet. In the case of the soft magnet, the sheet-shaped magnet 11 may be integrated with the resin sheet 12 by means of a bonding material or a pressure sensitive adhesive material.

Further, depending on the kind and the adhesion of the sheet-shaped magnet 11, a sheet 3 having the pressed dry flower sealed therein may be integrated directly without using the resin sheet 12. When the resin sheet 12 is used, a resin sheet, for example, made of a vinyl chloride resin, polyester, polyamide, epoxy resin or polyimide having a relatively high strength is used suitably.

The hot melt material is preferably used in the form of the hot melt film 311 or 312 as described above in view of the handlability and a sealing property but it may be used in a powdery form. For example, in FIG. 2, a powdery hot melt material can be used in place of one or both of the hot melt films 311 and the 312. Further, a porous film to be described layer is useful.

In the invention, for making the sealing property of the pressed dry flower favorable, those hot melt materials excellent in affinity with cellulose, adhering closely to the surface tissue of the pressed dry flower and having good defoaming property under a reduced pressure such as thermoplastic polyolefin, polyvinyl alcohol, polyvinyl acetate or polyvinyl ether are suitably used since they are excellent in close bondability with the pressed dry flower and defoaming property.

For the cover film described above, an appropriate heat resistant film may be used, or a hardened layer may be formed by applying coating or spraying to the outermost surface of the sheet 3 integrated with the sheet-shaped magnet substrate 1 as a post treatment. In this case, an acrylic or methacrylic resin having more excellent light fastness may be used.

Figure 3:
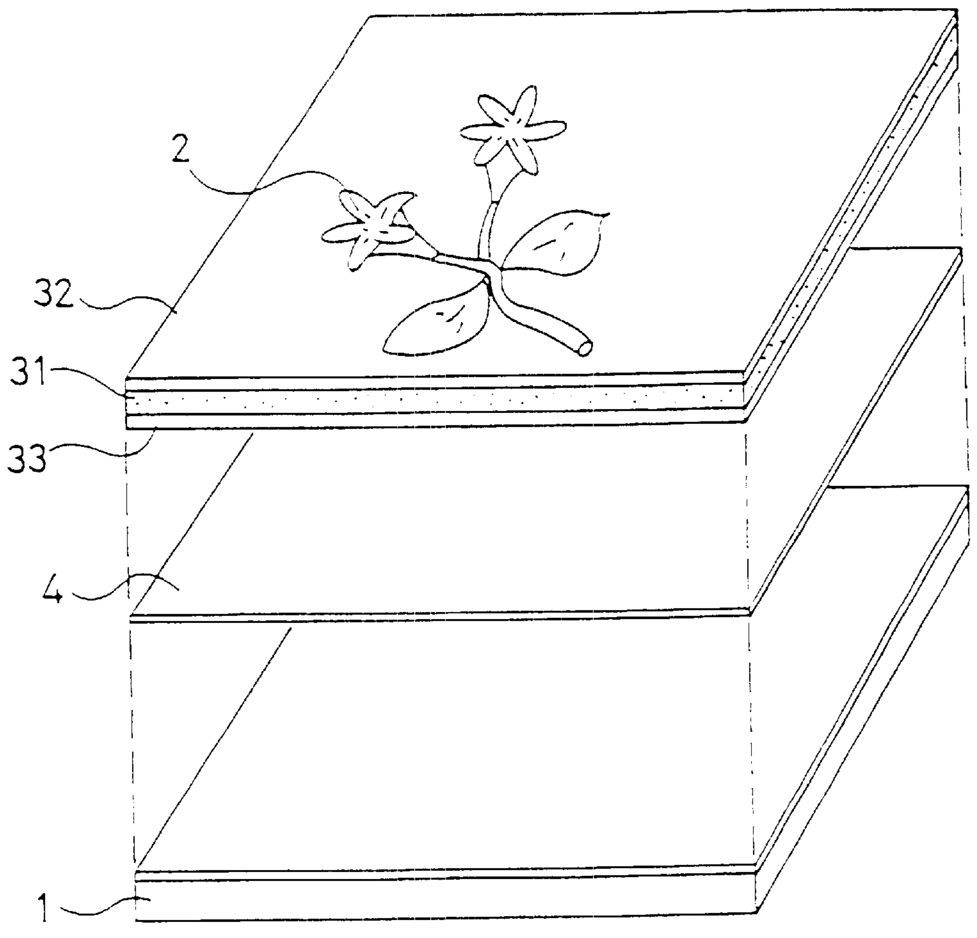
FIG. 3 is an exploded perspective view showing another embodiment.

FIG. 3 shows another embodiment of the invention. In the embodiment shown in FIG. 3, a sheet 3 in which a pressed dry flower is sealed in a hot melt fixing layer 31 has a substrate 33 and appended and integrated to the sheet-shaped magnet substrate 1 by means of a pressure sensitive adhesive material or a bonding material such as a both face adhesive tape material 4.

Figure 4:
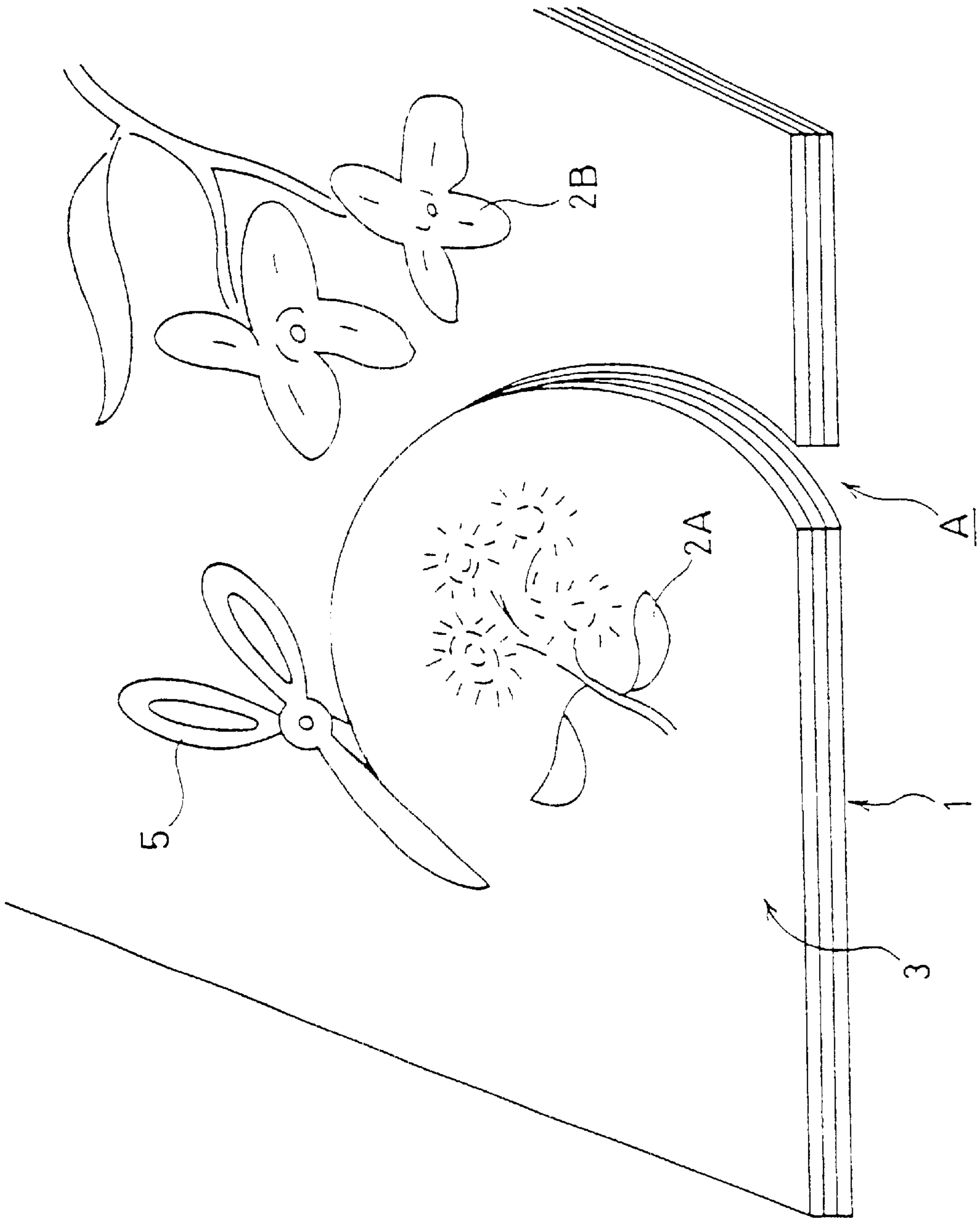
FIG. 4 is a perspective view showing a further embodiment which can be separated by cut out.

Further, as illustrated in FIG. 4, in a case of a magnetically attachable sealed pressed flower article of the invention using the hot melt material, it is preferred, for example, that the sheet-magnet substrate 1 and the sheet 3 can be separated integrally by using scissors 5 near the periphery (A) of the pressed dry flower 2 in a state it is sealed with the hot melt fixing layer 32.

Figure 5:
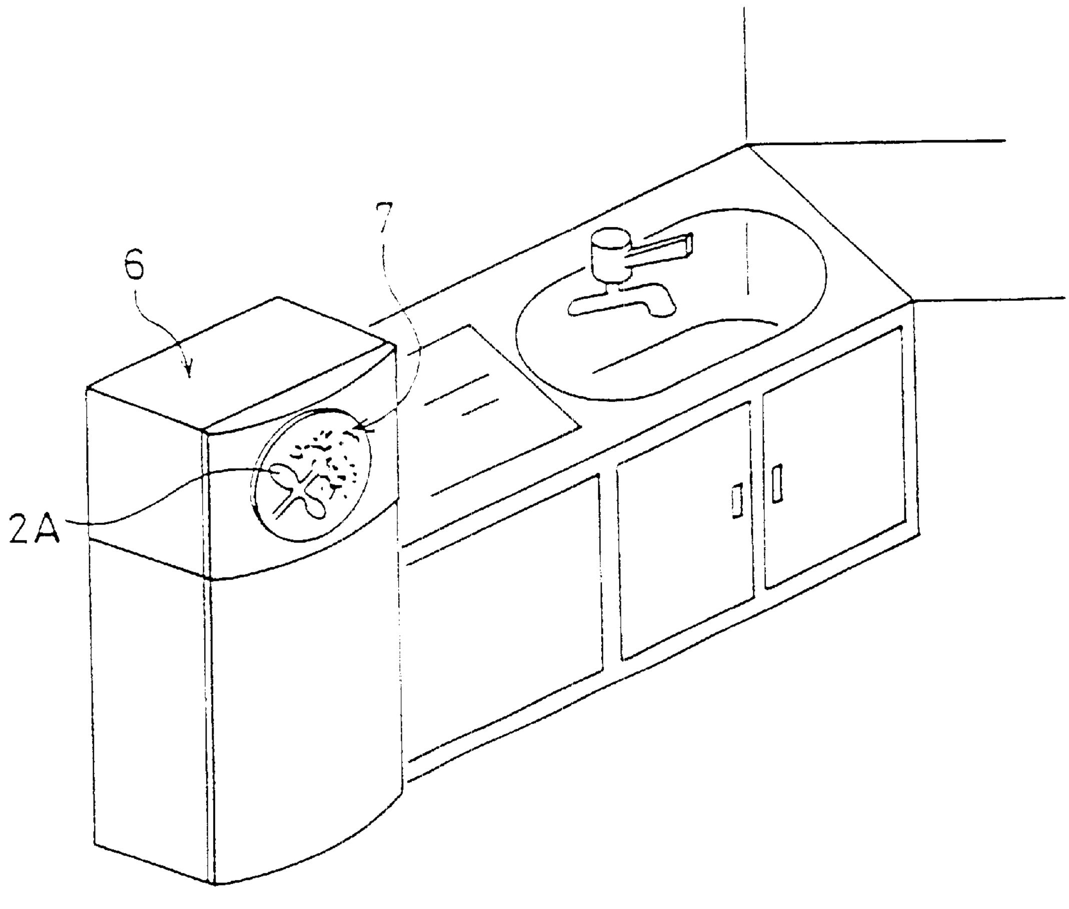
FIG. 5 is a perspective view illustrating an application example for the embodiment shown in FIG. 4.

In this embodiment, a plurality of pressed flowers 2A and 2B are assumed to be sealed. A desired pressed flower 2A is cut out near the periphery (A) thereof and can be appended magnetically as a decorative article 7 to the metallic surface of an electric equipment such as a refrigerator 6 or a furniture as shown in FIG. 5 and, further, it can be replaced with other appropriate cut out decorative article or the magnetically appended position may be changed.

The magnetically attachable sealed pressed flower article according to the invention can be detachably disposed at a desired position by magnetic attaching to attain the general purpose applicablility thereof and, at the same time, the conveniency and the decorative effect for furniture and interiors can further be improved by making the article separable by cutting out as shown in the example of FIG. 4.

For making the article separable by cutting out, it is necessary that the sheet-shaped magnet substrate itself can be cut easily. In view of the above, a soft and flexible article formed by integrally laminating a powdery magnetic material by means of a binder resin onto a resin sheet as described above is suitable.

Further, in the sheet 3, the pressed dry flower is intimately sealed as far as the surface portion by the hot melt material different from existent laminate articles, its sealing property is not lost even if the article is cut at a position just in the vicinity of the pressed flower. This can not be attained at all in the existent resin lamination product.

Further, the magnetically attachable sealed pressed flower article of the invention which is made separable by cutting out as in the example of FIG. 4 can be reused by cutting out a desired area. For example, even after the article has been used once as a card, a board or a sheet of business card, a desired pressed flower may be cut out along the periphery thereof into a desired planar shape, for example, a circular, polygonal or any other various kinds of profiled shapes and can be used again as a decorative article utilizing magnetic attaching.

Referring further to the example more specifically, the melt fixing portion 31 using melting hot melt material shown in FIG. 1 can be made more effective by using a melting porous resin film.

The melting porous resin film enables to release air and moisture at the periphery and on the surface of the pressed dry flower 2 to the outside through fine pores constituting the film when the film is melted under vacuum and also adhere closely to the pressed flower 2. More specifically, for effectively releasing air and moisture throughout the entire portion of the melting porous resin film, it is preferred that the film has a three dimensional open cell structure. Then, although differing somewhat depending on the type, it is necessary that the film also has a moderate melt adhesion for allowing embedding without damaging the color, shape and the tissue of the pressed dry flower.

With the view point described above, it is preferred that the melting porous resin film has a three dimensional open cell structure, and has an average pore size of about 1.5 mm or less, for example, from 0.05 to 1.5 mm, more preferably, about 1.0 mm or less, for example, from 0.1 to 1.0 mm, which corresponds to ASTM sieve standard of 18 to 140 mesh or TYLER mesh of 16 to 150 mesh and has a porosity of about 85% or less, preferably, 30 to 80% and is melted and welded at a temperature of about 120° C. or loser, preferably, 110° C. or lower and, further preferably, about from 60 to 85° C. Since the thickness of an intermediate layer as the melting and fixing layer 31 is appropriately 4000 μm or less, more generally, about 100 to 1000 μm, it is appropriate that the melting porous resin film is used by one to several sheets each having a thickness of about 150to 1500 μm.

Referring to the average pore size, while depending also on the thickness of the film, if the average pore size is less than 0.05 mm, not only the film is not easily available but also the efficiency of removing air or moisture under vacuum tends to be lowered. Further, if the pore size increases in excess of 1.5 mm, the close adhesion of the molten resin to the pressed flower, that is, the fillage for embedding tends to become insufficient. In view of the above, the melting porous resin film about 150 to 1500 μm in thickness appropriately has a melting temperature of about 110° C., more preferably, 60 to 85° C. and an average pore size of about 0.05 to 1.5 mm, more preferably, 1.0 mm or less and from 0.1 to 1.0 mm.

The melting porous resin film as described above is available as those prepared as a partial melting product of fine powder of the resin as the material, or a compact powder product thereof, those prepared as foams or those prepared from films by irradiation of light, plasma or radioactive rays. The resin as the raw material is selected in view of the close adhesion and affinity with the pressed flower 2, melting temperature, flowability during melting and productivity of the porous film. They can include, for example, polyethylene, ethylene—ethyl acrylate copolymer, ethylene—vinyl acetate copolymer, ethylene—acrylic acid copolymer and ethylene—methacrylic acid copolymer.

The ethylene—vinyl acetate copolymer is one of suitable materials and partial saponification product thereof, for example, a product with 10 mol % or less of saponification are preferred in view of the affinity with the pressed flower.

For preparing an intermediate layer 30 by embedding and sealing the pressed flower 2 by such a melting porous resin film (referring to the terminology of "film", it may be called also as a "sheet" with no substantial difference), it is appropriate to adopt a procedure, of placing a pressed dry flower 2 on the sheet-shaped magnet substrate 1, disposing thereon a melting porous film and a non-melting resin film forming a transparent film surface layer successively, and pressurizing under heating in a high vacuum atmosphere, or at first placing a melting porous resin film on the sheet-shaped magnet substrate 1, placing the pressed flower 2 thereon, further placing a melting porous resin film thereon again, placing the non-melting transparent resin film in the same manner as described above and then pressurizing them under heating in a high vacuum atmosphere. The latter means is adopted more preferably.

A fine powder of the same resin as that of the melting porous resin film may be scattered previously on the peripheral surface in the vicinity of the pressed flower 2 and pressed under heating. Scattering of the fine powder is effective in a case of the pressed flower of a larger thickness. The grain size of the powder is preferably 0.5 mm or less and 0.05 mm or more.

Further, the melting porous resin film and the fine powder preferably have high transparency for forming the intermediate layer by melting and hardening. This is because the sealed pressed flower 2 can exhibit its beautiful natural color more clearly through the transparent film. A pigment may also be added optionally such that the intermediate layer 3 has a characteristic tone and gives more beautiful appearance in combination with the pressed flower 2. Also in this case, a high transparency is of course desirable.

In the constitution of the invention described above, use of the melting porous resin sheet enables to release air residues or bubbles effectively to the outside without leaving them at the periphery and the vicinity of the surface of the pressed flower 2 under evacuation and closely adhere the molten resin throughout the entire surface of the pressed flower 2 to bury and seal the same. Therefore, this enables to prevent the pressed flower 2 from denaturation and discoloration with remaining atmospheric oxygen or moisture for a long period of time and keep natural clear color.

In such embedding sealing, even when an external force should damage the transparent film surface layer 8, the sealed condition is not broken and the pressed flower product does not suffer from degradation unless the injury reaches the pressed flower 2. Further, a sealed pressed flower article of a large surface area can be obtained by the use of the melting porous resin film. This is because air is rapidly released over the entire area by evacuation. This can be also attained in a case where a plurality of pressed flowers 2 of different kind and thickness are arranged on one identical plane, and pressed flower articles of excellent decoration performance having a large area can be provided such as for wall boards and partitionings.

Further, according to the invention, the article can be used again by cutting out as described above. Since a desired area can be cut out and utilized separately so long the cutting out does not effect the pressed flower 2. For instance, the sealed pressed flower article of the invention can be cut out and re-used as a part of a message card or telegram substrate paper. This is because the pressed flower 2 is entirely adhered with the molten resin to form the hardened intermediate layer 30.

The pressed flower 2 may be various kinds of flowers dried under vacuum and it may be an appropriate combination of petals, leaves, stalks or seeds of various kinds of flowering plants such as cosmos, pansy, Gypsophila elegans, rose and wheat.

Preferably, the transparent film surface layer is not melted upon pressurization under heating for forming the intermediate layer, has high transparency and less suffers from injury, wear and photo-or thermal degradation at the outermost surface thereof.

There is no particular restriction on the thickness of the film but it is usually about 300 $\mu$m or less and 40 to 300 $\mu$m in view of the production cost and the transparency. The transparent film surface layer may be a multi-layered structure with a portion in contact with the intermediate layer 30 having a good adhesion and the outermost surface thereof having a hard coat layer of high hardness, less tending to be injured and resistant to light and heat. For example, an adhesive layer, particularly, a thermally adhesive layer (heat sealing layer) may be disposed to the transparent film on the side of the intermediate layer 30 and a hard coat layer may be disposed to the outermost layer thereof.

In this case, as the transparent film, a film of polyester, polycarbonate, polypropylene or PET having satisfactory transparency and heat resistance may be used. As the thermally adhesive layer, it may be considered to use a film that exhibits adhesion upon pressurization under heating at a temperature of about 60 to 100° C. The film can include, for example, polyethylene, ethylene—ethyl acrylate copolymer and ethylene—vinyl acetate copolymer. Further, the hard coat layer can include, for example, an inorganic film such as made of silicon oxide or organic film such as made of acrylic resin, organic silicon resin or rigid urethane resin. Then, fine silica particles or fine particles of $TiO_2$, $ZrO_2$ and $SnO_2$ may be dispersed to the hard coat layer for providing the surface with the wear resistance and the anti-reflectivity. Further, fine electroconductive particles such as made of ITO (Indium Tin Oxide) may be dispersed for avoiding electrostatic deposition of dusts on the surface.

Provision of the anti-reflectivity or anti-static performance can improve the color of the sealed pressed flower 2 more clearly.

The thickness of the adhesive film is preferably about from 10 to 200 $\mu$m and the thickness of the hard coat. layer is preferably about from 1 to 4 $\mu$m.

The adhesive film or the hard coat layer is not always necessary. The constitution for the transparent film surface layer is determined depending on the application use of the sealed pressed flower article.

For improving the adhesion of the sheet-shaped magnet, the adhesive layer described above may be disposed or the surface may be roughened by a plasma or etching treatment to provide an anchoring effect.

When the sheet-shaped magnet substrate 1 is constituted with the sheet-shaped magnet 11 and the resin sheet 12, the resin sheet 12 may be a laminate of resin layers. The laminate may be constituted upon forming the sheet-shaped magnet substrate 1, or the resin layers may be laminated after the formation of the substrate. The resin sheet may be laminated, for example, by laminating, resin layers on the sheet-shaped magnet successively as shown by the following examples.

EXAMPLE 1 vinyl chloride resin (PVC)
Polypropylene (PP)
Polyethylene (PE)

EXAMPLE 2

Vinyl chloride resin (PVC)
Polypropylene (PP)

EXAMPLE 3

Vinyl chloride resin (PVC)
Polyethylene (PE)

EXAMPLE 4

Vinyl chloride resin (PVC)
Ethylene—Vinyl acetate copolymer (EVA)

EXAMPLE 5

Polyester (PET)

Polyethylene (PE)

Ethylene—Vinyl acetate copolymer (EVA)

The plasma or corona treatment described above may be applied to the surface of the polypropylene or polyethylene layer to improve the anchoring effect.

Then, when the resin sheet 12 is used as a flat substrate, the invention also provides a constitution free from curing or twisting. Further, as a background for making the tone of the sealed pressed flower 2 more clearly, the tone of the substrate 1 may be controlled.

That is, in the invention, curling or twisting of the substrate 1 caused by pressurization under heating can be suppressed effectively by laminating and integrating a plurality of films (sheets) such as made of vinyl chloride resin, polyester, polycarbonate, polysulfone or polypropylene having relatively excellent shape retainability. Further, the background effect of the substrate can be enhanced further by disposing a color print layer or a color compounded layer to the intermediate layer, the outermost layer or both of the layers in the laminated structure.

For example, a white film (sheet) is used for the substrate, which is laminated by way of a thermally adhesive layer or the like as the adhesive layer together with a color print layer. The color print layer is not always necessary in a case where the tone of the pressed flower 2 is shown as it is relative to the background color of the white film but the print layer is disposed in a case of changing the background color or a decorative background is used.

Further, in a case where the intermediate layer 30 has a somewhat somber tone the tone of the pressed flower can be made clear by the provision of a color print layer or a color compounded layer of cream color.

The adhesive layer may be constituted in the same manner as described above. When the substrate comprises a plurality of films (sheets), the thickness is generally about from 20 to 200 μm and the thickness of the adhesive layer is preferably about from 10 to 100 μm.

There is no restriction on the thickness of the sheet-shaped magnet substrate 1 and it is, for example, about from 0.1 to 10 mm with a practical point of view. The entire thickness of the resin sheet 12 is about 2000 gm or less and, more preferably, about from 100 to 1000 μm.

The color print layer or the color compounded layer uses any appropriate pigmenting ink, pigment or dye and, further, it may be designed by metal powder, adhesion or vapor deposition thereof.

The invention is to be explained more in details with reference to examples.

EXAMPLE 1

A cotton cloth was placed and a sheet-shaped magnet substrate was placed thereon in a plane area (300×300 mm) surrounded with rubber members disposed at four corners on a support bed having open holes for vacuum suction by using a press bonding apparatus under vacuum. The sheet-shaped magnet substrate has the following constitution and thickness from the upper layer to the lower layer:

| | |
|---|---|
| Polythylene (PE) | 20 μm |
| Polypropylene (PP) | 30 μm |
| White vinyl chloride resin (PVC) | 0.5 mm |
| Sheet-shaped magnet | 1.5 mm |

On the substrate, were stacked, successively, a melting porous resin film comprising ethylene—vinyl acetate copolymer of 0.6 mm thickness having melting point of 75° C., an average pore size of about 0.2 mm and a thickness of 0.6 mm (corresponding to ASTM 70 mesh), vacuum pressed dry flower of pansy, the same melting porous resin film as described above and a transparent film comprising a PET film of 150 μm thickness and pressed from above by about 1 atm under vacuum in a state as closer as an absolute vacuum degree of 760 mmHg at a temperature of about 80° C.

In the thus obtained magnetically attachable sealed pressed flower article, the intermediate layer was 800 μm in thickness, the transparent film surface layer was 150 μm in thickness, the pressed flower is sealed being adhered with the molten resin in the intermediate layer and air residues or bubbles were not observed at all.

Further, neither curling nor twisting was observed for the substrate.

The pressed flower kept natural tone over the long period of 6 months or more and the tone was clear and beautiful.

EXAMPLE 2

In Example 1, a melting porous resin sheet comprising a 5 mol % partial saponification product and, having an average pore size of 0.5 mm and a thickness of 1.3 mm (corresponding to ASTM 35 mesh) was used in Example 1 to form an intermediate layer of about 1000 μm thickness. A magnetically attachable sealed pressed flower article of excellent quality like that in Example 1 was obtained.

In any of the examples described above, when the article was cut out together with the magnet by scissors into a desired shape, it could be utilized again with no destruction for the sealing condition as magnetically attachable decorative articles.

It will be appreciated that the invention is no way restricted by the examples described above but various modifications are possible.

As has been described above specifically, according to the invention of the present application, the degree of freedom such as in selection and alteration of position for attachment or the exchange of pressed flowers can be improved for the sealed pressed flower, by detachable magnetic attaching and the general applicability can be improved greatly.

The foregoing effect can be further improved in those adopted for separation by cutting out. Further, an article once used can also be utilized again.

What is claimed is:

1. A magnetically attachable sealed pressed flower article comprising an intermediate layer comprising a sheet, a pressed dry flower being sealed and fixed in the sheet by a melting and securing of a hot melt material, the sheet being disposed integrally on one side of a sheet-shaped magnet substrate.

2. A magnetically attachable sealed pressed flower article according to claim 1, wherein the sheet-shaped magnet substrate comprises a magnetic powder that acts as a magnetic layer attached to a resin sheet via a resin binder and wherein said magnetic layer is magnetized.

3. A magnetically attachable sealed pressed flower article according to claim 1, wherein the intermediate layer is a resin sheet and the sheet-shaped magnet substrate is prepared by appending a sheet-shaped permanent magnet to the resin sheet.

4. The magnetically attachable sealed pressed flower article according to claim 1, wherein the intermediate layer is formed by appending and integrating the hot melt material to the sheet.

5. The magnetically attachable sealed pressed flower article according to claim 1, wherein the intermediate layer is appended and integrated with the magnetic substrate by a pressure sensitive adhesive material.

6. The magnetically attachable sealed pressed flower article according to claim 1, further comprising a transparent cover film layer over the intermediate layer serving as an outermost layer.

7. The magnetically attachable sealed pressed flower article according to claim 6, wherein the thickness of the transparent cover film is 300 μm or less.

8. The magnetically attachable sealed pressed flower article according to claim 6, wherein the transparent cover film is a multi-layered lamination film.

9. The magnetically attachable sealed pressed flower article according to claim 6 further comprising a hard coat layer over the transparent cover film serving as the outermost surface layer.

10. The magnetically attachable sealed pressed flower article according to claim 6, further comprising a hot melt material between the sheet-shaped magnet substrate and the intermediate layer.

11. The magnetically attachable sealed pressed flower article according to claim 1, wherein the hot melt material is a hot melt film or hot melt powder.

12. The magnetically attachable sealed pressed flower article according to claim 1, wherein the intermediate layer has a thickness of 4000 μm or less.

13. A method for producing a magnetically attachable sealed pressed flower article, comprising the steps of:

layering successively a first hot melt film, a pressed dry flower, a second hot melt film and a sheet-shaped magnet substrate; and hot-pressing the layers under.

14. The method for producing the magnetically attachable sealed pressed flower article according to claim 13, further comprising the step of:

layering a transparent cover film over the first hot melt film.

15. The method for producing the magnetically attachable sealed pressed flower article according to claim 13, wherein the first hot melt film and second hot melt film are porous resin films.

16. The method for producing the magnetically attachable sealed pressed flower article of claim 15, wherein each porous resin film has a three-dimensional open cell structure.

17. The method for producing the magnetically attachable sealed pressed flower article according to claim 15, wherein each porous resin film has an average pore size of 1.0 mm or less.

18. The method for producing the magnetically attachable sealed pressed flower article according to claim 15, wherein each porous resin film has a melting temperature of 110° C. or lower.

* * * * *